United States Patent Office 2,698,335
Patented Dec. 28, 1954

2,698,335

HYDROCARBON SYNTHESIS PROCESS AND CATALYST THEREFOR

Simpson D. Sumerford, Baton Rouge, La., assignor to Standard Oil Development Company, a corporation of Delaware No Drawing. Application November 30, 1949, Serial No. 130,340

3 Claims. (Cl. 260—449.6)

The present invention relates to the catalytic conversion of CO with $H_2$ and improved catalysts therefor. More particularly, the invention pertains to improved iron-type catalysts for fluid synthesis operation which are of increased physical strength and to a method of preparing such catalysts by subjecting iron-type catalyst preparations to a treatment involving repeated alternate heating and cooling.

Iron-type catalysts are normally employed in the hydrocarbon synthesis at relatively high temperatures of about 450°–800° F. and relatively high pressures of about 5–100 atmospheres abs. or higher, to obtain predominantly unsaturated and oxygenated products from which motor fuels with high octane ratings and various chemicals may be recovered.

The extreme temperature sensitivity and relatively rapid catalyst deactivation in the hydrocarbon synthesis have led in recent years to various attempts and proposals to employ the so-called fluid catalyst technique wherein the synthesis gas is contacted with a dense turbulent bed of finely divided catalyst fluidized by the gaseous reactants and reaction products and which permits continuous catalyst replacement and greatly improved temperature control. In these fluid operations, the catalyst particles generally have sizes in the range of 5–200 microns and higher. These particles are maintained in a fluidized ebullient state by means of an upflowing gas, the velocity of which is in the range of about 0.1–5 ft. per second or higher, depending on the particle size and specific gravity of the solids charge of the reactor. However, the adaptation of the hydrocarbon synthesis to the fluid catalyst technique has encountered serious difficulties, particularly where iron catalysts are used.

Application of the fluid catalyst technique requires ease of fluidization and attrition resistance in addition to the conventional characteristics determining catalyst utility, such as total desired yield, liquid product selectivity and active catalyst life. The utility of iron catalysts declines steadily in the course of the strongly exothermic synthesis reaction, chiefly due to the deposition of fixed carbon or coke-like materials formed by the dissociation and cracking of CO and unstable hydrocarbons which take place at the relatively high temperatures and pressures associated with the use of iron-type catalysts. If allowed to accumulate excessively, these carbon or coke deposits adversely affect particularly those characteristics of the catalyst which determine its utility in fluid operation. More particularly, carbon or coke deposits have been found to cause rapid disintegration of the catalyst particles leading to a substantial and undesirable expansion of the fluidized bed and ultimately to the requirement of complete catalyst replacement because of fluidization difficulties. Catalysts broken down in this manner must either be restored to a fluidizable size or are lost for further use.

Iron catalysts are usually prepared by a reduction of various natural or synthetic iron oxides, their catalytic activity and liquid product selectivity being enhanced by the addition of such promoters as various compounds of alkali metals, particularly the halides, carbonates and oxides of potassium and sodium in small amounts of about 0.5–10%. Hydrogen or mixtures of hydrogen and carbon monoxide, such as fresh synthesis gas, are normally used as the reducing agent, preferably in the synthesis reactor itself at temperatures of about 600°–1600° F. All these catalysts are either subject to excessive carbonization and disintegration in fluid operation or their activity and/or selectivity to useful products are too low for satisfactory operation.

The present invention substantially reduces these difficulties and affords various additional advantages as will be fully understood from the detailed description given below.

In accordance with the present invention, the disintegration rate of conventional iron-type catalysts is materially reduced by a treatment of such catalysts after reduction, but prior to synthesis operation, which consists in subjecting the reduced catalysts to alternate periods of heating and cooling. More specifically, the catalysts are maintained during the heating periods at temperatures between about 800°–1400° F., preferably 900°–1100° F., for about 5–60 hours, preferably about 10–50 hours, per period and cooled to room temperature after each heating period. The rate of cooling may be varied within wide ranges but is preferably so controlled that room temperature is reached within about 1 to 2 hours. The number of cycles, consisting each of a heating and a cooling period, may be as high as ten. However, 2–5 of such cycles are usually adequate for the purposes of the invention. This pretreatment of the catalyst, while having little or no effect on the carbonization tendencies of the catalyst, considerably reduces its disintegration rate, presumably as a result of a substantial increase in its physical strength.

In order to prevent reoxidation of the catalyst during the treatment of the invention oxygen must be excluded. This may be accomplished by carrying out the treatment under a blanket of hydrogen, $N_2$ or any other inert gas free of oxygen. The treatment may also be combined with catalyst reduction by starting out with oxidized iron materials and using hydrogen at least in one or more of the initial cycles. However, it is critical for the purposes of the present invention that the catalyst after reduction is subjected to a series of heating and cooling cycles as described above.

The advantages of the invention will be further illustrated by the following specific examples.

*Example I*

Pyrites ash resintered with about 2–8%, preferably about 5%, of coke in accordance with the procedure outlined in U. S. Patent No. 2,565,977, e. g., Example I thereof was ground to a particle size of about 100–325 mesh and reduced with hydrogen in a fluid-type synthesis reactor at 1050° F. for 50 hours. Synthesis operation was started without further treatment and carried out at the conditions and with the results specified below.

$H_2$:CO ratio, fresh feed_____ 1.84
Temperature, °F_____ 650
Pressure, p. s. i. g_____ 400
Superficial linear inlet gas velocity, ft./sec_____ 0.57
Recycle ratio, vol. of recycle gas per vol. of fresh feed _____ 2
CO conversion, percent_____ 99
$H_2$+CO conversion, percent_____ 95
$C_4$+ hydrocarbon yield, cc./m.$^3$ of $H_2$+CO consumed _____ 193
$C_3$+ hydrocarbon yield, cc./m.$^3$ of $H_2$+CO consumed _____ 270

After 287 hours of operation the catalyst was examined. Total carbon on the catalyst as discharged amounted to 36.6%. The proportion of particles of 0–20 microns size in the catalyst bed increased to 46% from an original content of 1%. This was equivalent to a "carbon accumulation rate" (C. A. R.) of 16 lbs. of carbon per 100 lbs. of Fe per 100 hours and a "disintegration rate" of 20 lbs. of particles of 0–20 microns size formed per 100 lbs. of Fe per 100 hours. Such C. A. R. and disintegration rate values are typical for high activity, high selectivity iron-type catalysts.

*Example II*

Reduced catalyst taken from the batch prepared for Example I was heated to 1050° F. in a stream of hydrogen for 50 hours and then cooled to room temperature within about 1–2 hours and this procedure was repeated two times with heating periods of 10–15 hours each. Thereafter synthesis operation was started and continued for 235 hours at the conditions and with the results tabulated below:

| | |
|---|---|
| $H_2:CO$ ratio, fresh feed | 1.75 |
| Temperature, °F | 650 |
| Pressure, p. s. i. g. | 400 |
| Superficial linear inlet gas velocity, ft./sec. | 0.65 |
| Recycle ratio, vol. of recycle gas per vol. of fresh feed | 1.7 |
| CO conversion, per cent | 96.5 |
| $H_2 + CO$ conversion, per cent | 89.9 |
| $C_4+$Hydrocarbon yield, cc./m.$^3$ of $H_2+CO$ consumed | 189 |
| $C_3+$hydrocarbon yield, c.c./m.$^3$ of $H_2+CO$ consumed | 246 |

Thereafter the catalyst was examined as in Example I. Total carbon amounted to 38.7% corresponding to a C. A. R. of 17. However, the particle fraction of 0–20 microns size had increased to only 15% from the original 1%, corresponding to a disintegration rate of 6, at otherwise similar conditions.

The results of Examples I and II with respect to catalyst disintegration and carbon formation are summarized below:

| Example | I | II |
|---|---|---|
| Number of Heat Treatments | 1 | 3 |
| Total Carbon, Wt. Percent | 36.6 | 38.7 |
| C. A. R. | 16 | 17 |
| Disintegration Rate | 20 | 6 |

The above comparison in combination with the more detailed data of Examples I and II demonstrates that the process of the invention reduces the disintegration tendency of iron catalysts to less than ⅓ of its usual rate at similar synthesis conditions and similar excellent yields of useful products, and this in spite of a slight increase in carbon formation. These data are, therefore, evidence for a substantial increase in the physical strength of the catalyst.

The above description and exemplary operations have served to illustrate specific embodiments of the invention but are not intended to be limiting in scope.

What is claimed is:
1. An improved iron catalyst for the fluid-type synthesis of hydrocarbons from $H_2$ and CO which has a distintegration rate not exceeding 6 and and a carbon accumulation rate of about 17 and which is obtained by heating a reduced iron catalyst derived from pyrites ash at least twice to 800°–1400° F. for 5–60 hours and cooling said heated catalyst to room temperature between heating periods, the said heating and cooling steps being carried out in a non-oxidizing atmosphere.

2. In the preparation of iron catalysts useful in the fluid-type synthesis of hydrocarbons from $H_2$ and CO, the improvement which comprises subjecting a reduced iron catalyst derived from pyrites ash at least twice to a heat treatment of 800°–1400° F. for 5–60 hours and cooling the heated catalyst to room temperature between heating periods, the said heating and cooling steps being performed in a non-oxidizing atmosphere, prior to its use.

3. In the process of synthesizing normally liquid hydrocarbons from $H_2$ and CO in the presence of a fluidized iron catalyst, the improvement which comprises contacting said $H_2$ and CO at synthesis conditions with a dense, turbulent, fluidized bed of a finely divided iron catalyst derived from pyrites ash having a disintegration rate of not exceeding 6 and a carbon accumulation rate of about 17 which is obtained by heating a reduced iron catalyst at least twice to 800°–1400° F. for 5–60 hours and cooling said heated catalyst to room temperature between heating periods, the said steps of heating and cooling being performed in a non-oxidizing atmosphere.

References Cited in the file of this patent

UNITED STATES PATENTS

| Number | Name | Date |
|---|---|---|
| 2,485,945 | Walker | Oct. 29, 1945 |
| 2,462,861 | Gunness | Mar. 1, 1949 |
| 2,469,755 | Voorhies, Jr. | May 10, 1949 |
| 2,541,654 | Jones et al. | Feb. 13, 1951 |
| 2,565,977 | McAdams et al. | Aug. 28, 1951 |
| 2,601,121 | Mattox | June 17, 1952 |